J. HINKLEY.
KNITTING-MACHINE.

No. 173,406. Patented Feb. 15, 1876.

Witnesses:
Lovel Shaw
H. E. Metcalf

Inventor:
Jonas Hinkley
Per C. E. Shaw
Atty.

J. HINKLEY.
KNITTING-MACHINE.

No. 173,406.  Patented Feb. 15, 1876.

Witnesses:
Jere L. Shaw
H. E. Metcalf

Inventor,
Jonas Hinkley
Per C. A. Shaw
Atty.

J. HINKLEY.
KNITTING-MACHINE.

No. 173,406. Patented Feb. 15, 1876.

Witnesses:
Levi Isham,
H. E. Metcalf.

Inventor:
Jonas Hinkley,
Per C. A. Shaw, Atty.

4 Sheets—Sheet 4.

J. HINKLEY.
KNITTING-MACHINE.

No. 173,406. Patented Feb. 15, 1876.

Witnesses:
Inventor:
Jonas Hinkley,
Per
Atty.

UNITED STATES PATENT OFFICE.

JONAS HINKLEY, OF NORWALK, OHIO.

IMPROVEMENT IN KNITTING-MACHINES.

Specification forming part of Letters Patent No. 173,406, dated February 15, 1876; application filed July 6, 1875.

*To all whom it may concern:*

Be it known that I, JONAS HINKLEY, of Norwalk, in the county of Huron, State of Ohio, have invented a certain new and useful Improvement in Knitting-Machines, of which the following is a description sufficiently full, clear, and exact to enable any person skilled in the art or science to which my invention appertains to make and use the same, reference being had to the accompanying drawings forming a part of this specification, in which—

Figure 1:
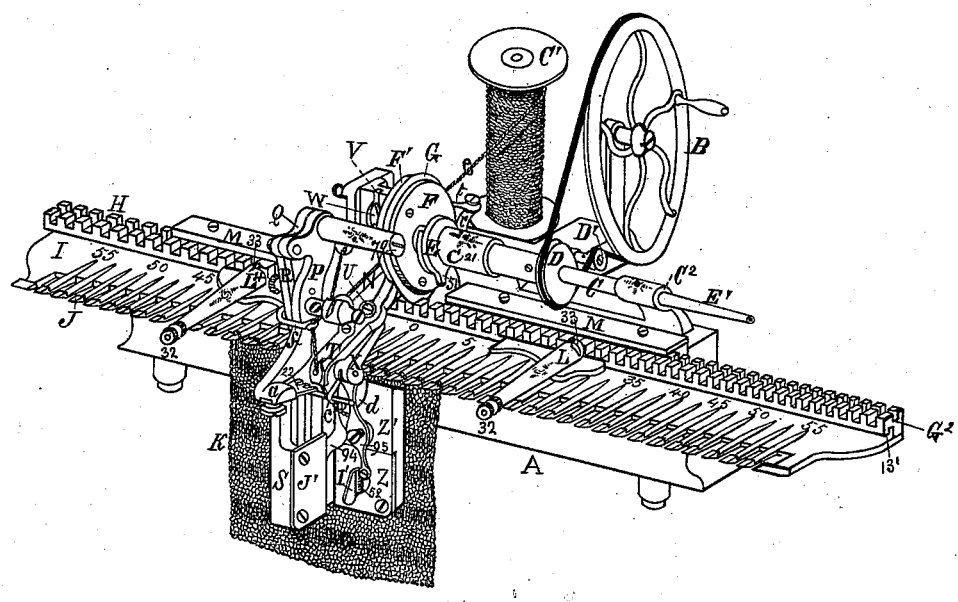
Figure 2:
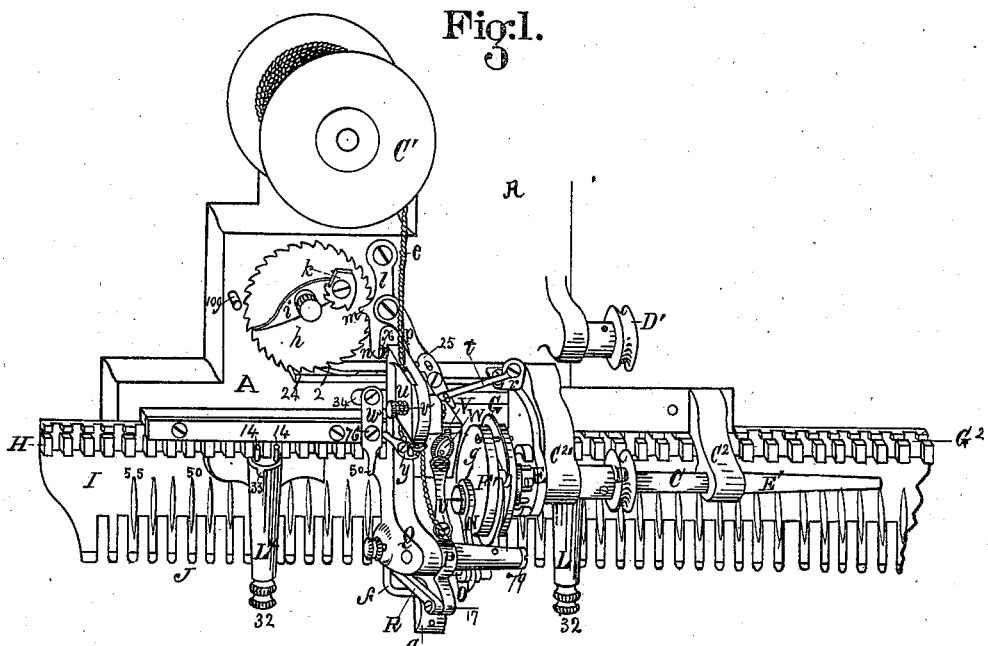
Figure 3:
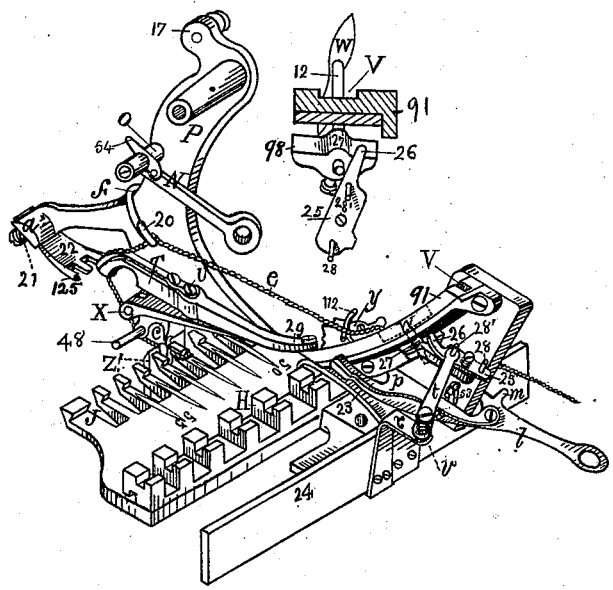
Figure 5:
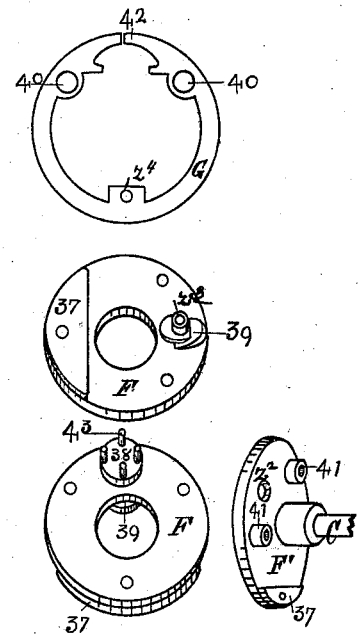
Figure 4:
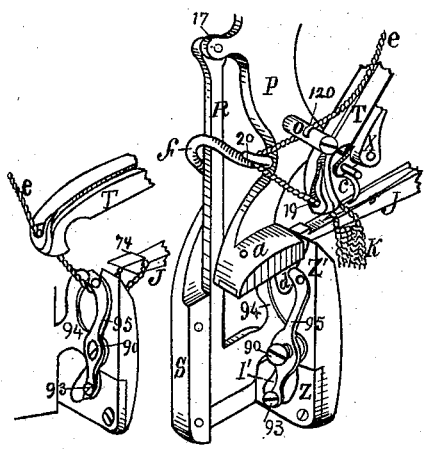
Figure 6:
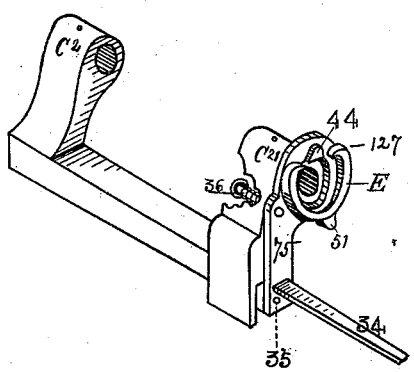
Figure 7:
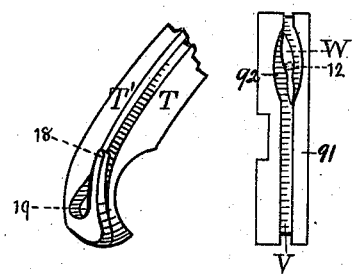
Figure 8:
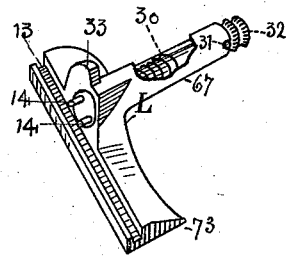
Figure 9:
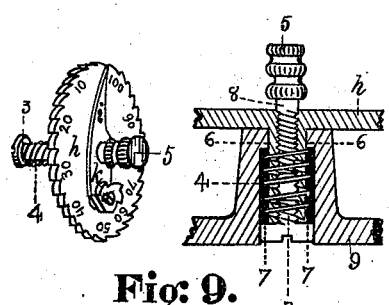
Figure 10:
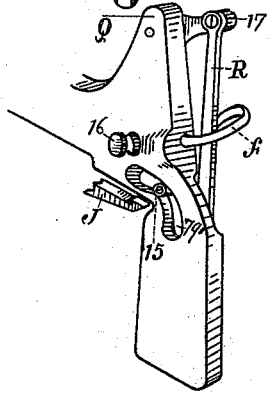
Figure 11:
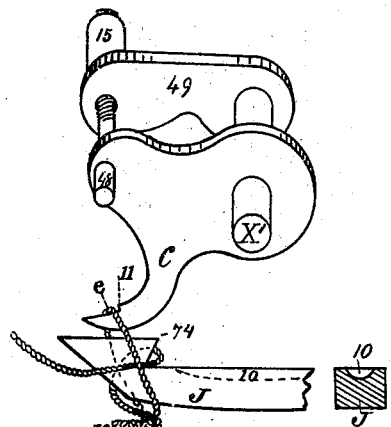
Figure 12:
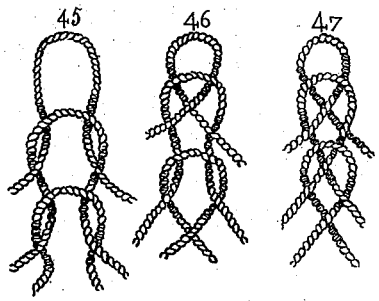
Figure 13:
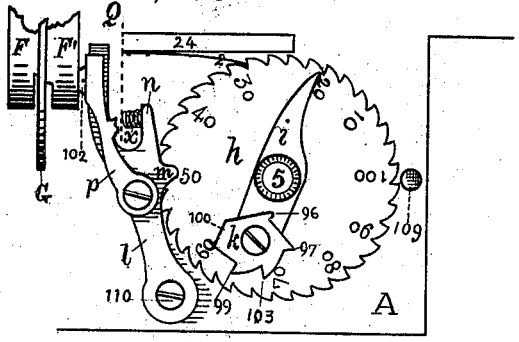
Figure 14:
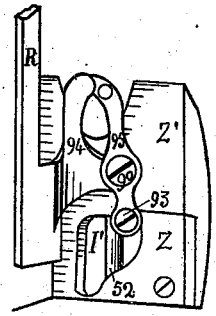
Figure 15:
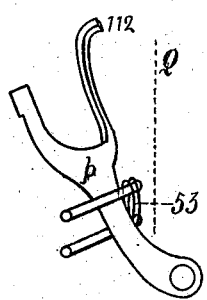

Figure 1 is an isometrical projection, showing the machine in use; Fig. 2, an isometrical projection, showing the top of the machine; Fig. 3, a sectional isometrical projection looking from the rear of the machine, and showing the looping mechanism; Fig. 4, an enlarged sectional view, showing parts of the stitch-forming mechanism; Fig. 5, views, showing parts of the actuating gear and the shipping mechanism; Fig. 6, a sectional view, showing the shipping mechanism cam and its plate; Fig. 7, enlarged sectional views of the thread-carrier and a part of its reversing mechanism; Fig. 8, a sectional view, showing one of the stop mechanisms or gages; Fig. 9, sectional views of the index mechanism; Fig. 10, an isometrical projection of the looper-cam; Fig. 11, an enlarged sectional isometrical projection, showing the looper and the method of forming the stitch; Fig. 12, a view showing the different varieties of stitches made by the machine; Fig. 13, a plan view of the stop mechanism and index; Fig. 14, a view of the finger and the finger-cam; Fig. 15, a view of the upper or auxiliary stop-lever, and Fig. 16 a transverse vertical section of the stripper.

Like letters of reference indicate corresponding parts in the different figures of the drawings.

My invention relates to that class of knitting-machines in which the web or work is set up and supported during its formation upon a straight serrated reciprocating bar or comb; and consists in a novel construction and arrangement of the parts, as hereinafter more fully set forth and claimed, by which a simpler, cheaper, and more effective device of this character is produced than is now in ordinary use.

The nature and operation of my invention will be readily obvious to all conversant with such matters from the following description:

In the drawings, A represents the bed piece or body of the machine, and B the driving-wheel. The wheel is grooved around its periphery and belted to the pulley D on the counter-shaft C. This shaft is journaled horizontally in the brackets $C^{21}$ $C^2$ projecting upwardly from the bed A, and is elongated at one end to form the spindle E', and carries at its opposite end the actuating gear mechanism F, as seen in Fig. 1. This mechanism consists of two annular disks, F F', best seen in Fig. 5. The disk F' is fixed upon the outer end of the shaft C, and has projecting from its inner surface two pillars, 41, and the plano-convex-shaped rest 37. The disk F is provided with a corresponding rest, 37, and is disposed on the same shaft with F', but nearer the bracket $C^{21}$, the two disks when in position being connected by proper screw-bolts passing through holes in the pillars 41. The disk F has a short horizontally-arranged shaft, $Z^3$, journaled near one of its sides, and on the inner end of this shaft there is a grooved cam, 39, the outer end carrying a face plate or disk, 38, having four equidistant studs, 43, projecting from its outer surface. The shaft $Z^3$ is elongated and fitted to work in the hole $Z^2$, located midway between the pillars 41 in the disk F', the cam 39 being between the disks when they are in position and connected by screws, as described. A thin steel ring or fin, G, bisected at 42, and provided with the holes 40 and $Z^4$, is disposed midway between the disks F and F', being secured in position by a screw or rivet passing through the hole $Z^4$, and holes in the pieces 37, and by the pillars 41, which extend through the holes 40 in the ring.

The free ends 42 of the ring G work in the groove of the cam 39, the opposite side of the ring being firmly clamped and held between the rests 37.

It will be obvious that the ring G and disks F F' form a worm-gear or screw, having a flexible fin or thread, by which the action of the gear may be reversed. Disposed to slide upon the shaft C, between the disk F and bracket $C^{21}$, there is a plate, 75, provided upon its face nearest the disk F with the evolute or cam E, stud 44, and dog 51. A rod, 36, is secured to the rear side of the plate and fitted to work in a hole in the bracket C²¹, a coiled spring being arranged around the rod in such a manner that its expansive action will tend to keep the plate against the bracket. There is also a steady-pin, 35, in the lower end of the plate 75, which is fitted to slide in a hole in the base of the bracket, and acts to keep the plate in proper position when the machine is in use. The stud 44 is so disposed on the plate 75 as to be nearer the shaft C than is the cam E, and is of just the right length to permit the studs 43 to pass it on the same vertical plane, as they are carried around the shaft C by the disk F, without coming into contact with it so long as the plate 75 is kept against the bracket C²¹. The stud 44 is also shorter, or does not project from the plate 75 so far as the cam E, so that when the parts are in working position, as best shown in Fig. 2, one of the studs 43 will continue to pass the stud 44 on a plane with it, and will be carried around with the shaft C inside of the cam E as the disk F is revolved, the other studs, 43, in the meantime revolving or being carried around outside of the cam E until the shipping mechanism is operated to reverse the movements of the machine, as hereinafter described.

A flattened bar, I, provided upon its front edge with serrations or teeth J, and upon its upper side, near the opposite edge, with the rack H, is fitted to slide in the ways or runlets M M, being caused to receive reciprocating longitudinal movements by means of the pin or ring G, with which it intersects. A groove, G², is cut transversely through the teeth of the rack, into which a downwardly-bent flange on the upper plate of the ways M projects, to prevent any undue lateral movements of the bar.

The teeth J are chamfered on their under sides, or curved upwardly near their points or outer ends, and provided with hooks 74 and grooves 10 upon their upper sides, as best seen in Fig. 11.

Disposed upon the bar I there are two stop mechanisms or gages, L L⁴, which traverse conjointly with the bar. The construction and operation of these will be understood by reference to Fig. 8, in which L is the body of the gage, and 13 a groove, into which a downwardly-turned flange or lip, 13′, on the bar I projects, when the gage is in use, to keep it in place.

The arm 67 is drilled longitudinally to receive the rod 30, which is provided at its outer end with the rosette 32, and at its inner end with two studs or pins, 14. Arranged around the rod there is a coiled spring, resting at one end upon a shoulder formed in the arm, and at the other against a shoulder cut in the rod, and acting expansively to draw the rosette down against the end of the arm, and cause the pins 14 to intersect with the rack H, when the gage is in working position on the bar.

A small pin, 31, passes laterally through the rod near the rosette, the ends of the pin projecting beyond the body, and falling into slight depressions in the end of the arm, the object of the pin and depressions being to prevent the gage from accidentally changing its position on the bar, by keeping the studs 14 astride of the tooth at which it is set.

The depressions in the end of the arm are gradually sloped or curved, so that when the gage is in position, and the rosette is forcibly turned to the right or left, the pin will ride out of the depressions, the spring within the arm be compressed, and the studs 14 act as a pinion to cause the gage to be moved back or forth on the bar, as the case may be.

The body of the gage is provided with a pointer or index, 73, and with an upward projection, 33. The index is used in connection with a series of numbers on the bar to determine the correct position of the gage with respect to the teeth, the object of the projection 33 being to change the movements of the bar I, which is accomplished as follows: The plate 75 is provided with a downwardly-projecting dog, 51, and at its lower end with a horizontal sliding bar, 34. This bar, which is arranged in parallelism with the bar I, extending along the machine in the rear of and below the disks F F′, is jointed to one end of the lever w, which is centrally pivoted at 76 to the plate M, the opposite end of the lever extending over the bar I, as shown at 50 in Fig. 2. The gages L L⁴ being adjusted on the bar, as shown in Fig. 1, if the bar is now caused to traverse from left to right, the projection 33 on the gage L⁴ will be brought into contact with the end 50 of the lever w, drawing the bar 34, and with it the plate 75, toward the gage L⁴, causing the stud 44 to be brought into contact with that one of the studs 43 which is then revolving within the cam E, thereby partially rotating the cam 39, changing the position of the free ends 42 of the fin G, and reversing the motion of the bar I in a manner which will be readily apparent without a more detailed explanation.

The movement of the bar I being reversed, as described, and caused to advance from right to left, the projection 33 on the gage L will be brought into contact with the dog 51 on the plate 75, sliding the plate along the shaft C and producing another partial revolution of the cam 39 and a reverse movement of the bar I, as before.

The stud 44 is rounded upon its upper or outer side, and the contiguous parts of the cam E so formed than when one of the studs, 43, strikes the stud 44, it passes over it, causing the next adjoining stud on the plate 38 to pass under or within the cam and the plate 38 to tumble and partially rotate the cam 39.

Projecting forward from the body A, over and in front of the bar I, there is a fixed arm or bracket, Q, in which the principal working parts of the loop-forming mechanism are disposed. A tri-armed pendulous lever, P, is pivoted at 79 to the upper forward end of the arm Q, and is connected at $g$ to the disk F' by the pitman-rod N.

A latch, 54, is pivoted to the pitman-rod, and arranged to fall into a slot, 120, in the stud O, to which the outer end of the pitman is connected in such a manner as to enable the pitman to be readily detached from the disk by raising the latch and sliding the pitman toward the lever.

A toothed plate or stripper, 22, is hinged at its outer end to the arm $a$ of the lever P, and is provided with a spring, 21, which permits it to yield vertically. The object of this plate is to force the loops back on the teeth of the bar I into position to be properly taken by the looper $c$.

The looper, which is best seen in Fig. 11, is pivoted to the arm X of the lever P, being actuated by the pin X' and plate 49, having a stud, 15, working in the cam-shaped slot 79'.

Pivoted at U to the upper side of the arm X there is a thread-carrier, T, provided with a spring-cap, T'. This cap has at its outer end a hook, 18, and is to enable the thread to be inserted in the carrier more readily, a throat being formed on the line 19, in the end of the carrier and between the same and the cap T', to serve as a channel for the thread to pass to the work.

An adjustable thread-guide, $f$, provided with the hook 20, is secured in the arm Q by the screw 16. This guide also serves as a part of the tension mechanism, the texture of the fabric being principally determined by the distance of its hook 20 from the teeth J and looper $c$.

Jointed to the arm 17 of the lever P there is a stock, R, fitted to slide vertically in the ways or runlets S J'. This stock is provided with the rigid, upwardly-projecting, curved finger 94, to which is pivoted the corresponding vibratory finger 95 by means of the screw-stud 90. Between the head of the stud and the finger 95 there is a coiled spring, (not shown,) which permits the finger to yield laterally, and also to rock slightly on its seat. The lower end of the bracket Q has an angular projection, Z', to which is attached a plate, Z, provided with an irregular cam-shaped slot, I'. A stud, 93, fixed in the lower end of the vibratory finger 95, projects into this slot, and works in contact with the edges thereof; and also with a vertical rib, 52, or interiorly-arranged elevation on the projection Z', extending within the slots I', as best seen in Fig. 14.

The shape of the cam-slot I' is such that, as the stock R descends, the stud 93, following the outline of the slot farthest from the finger 94, is caused to pass over the rib 52 at its lower end, into the lowest part of the same, opening the points of the fingers to their fullest extent, and, as the stock is carried upward, the stud is kept on that side of the slot nearest the finger 94 until the points of the finger are nearly opposite the teeth J, when it is again caused to cross the rib, but, at the upper end of the same, rapidly closing the fingers, the formation of the slot at this point being such as to effect this properly.

It will be seen that the rib 52, and the side of the slot I' farthest from the finger 94, form a channel or runlet, in which the stud 93 descends, and that the rib and side of the slot nearest the finger 94 form a similar runlet, in which the stud ascends, the conformation of the slot not only determining the movements of the finger 95, but acting to automatically ship the stud 93 from side to side of the rib 52.

The rear end of the thread-carrier T is curved upwardly, and provided with a stud, 29, which works in the slot V of the curved bar 91. This slot is enlarged at 92 to receive the shipping-feather W mounted on the rocking shaft 12, which shaft extends through the bar 91, and is provided at its opposite end with the cross-bar or lever 98. The feather is kept in position by the spring-plate 25, which plate is pivoted to a bracket on the rear of the bar 91, its point 26 pressing upon the arms of the cross-bar 98, as best shown in Fig. 3. The screw or stud by which the plate 25 is pivoted to its bracket is provided with a coiled spring (not shown) pressing upon the plate, and which permits the point of the same to be elevated to pass the boss or ridge 27 formed at the center of the cross-bar 98. The plate has two upwardly-projecting studs or pins, 28 and 28', disposed upon the opposite sides of its pivotal attachment, as shown, and is connected with the sliding bar 24 by means of the bracket $r$ and rod $t$. The sliding bar is arranged to work in proper ways at the rear of the brackets Q and $C^{21}$, and is provided with an inwardly-extending arm, 23, which passes over the rack H, and is bent downwardly, in front of the same, between the contiguous ends of the gages L L$^4$, immediately under the thread-carrier T.

As the bar I traverses back and forth the gages are brought into contact with the bent end of this arm, causing the bar 24 to be alternately moved in opposite directions at the termination of each course or row of stitches, thus, by means of the bracket $r$ and rod $t$, vibrating the plate 25, causing its point to pass from one side to the other of the ridge 27, rocking the shaft 12, and changing the position of the feather W, and, through it, the movements of the thread-carrier T.

A vertical stud or hub, 9, rises from the bed A, near the rear of the bracket Q. This hub has a hole through its center to receive a stem or stud projecting downwardly from the index-plate $h$, and is counterbored from below to form the shoulder 6. A screw, 3, the head of which exactly fits the counterbore in the hub, 9, is screwed into the lower end of the stem of the index-plate, and between the head of the screw and the shoulder there is a coiled spring, 4, which acts expansively to draw the plate $h$ down upon the top of the hub. An index-finger or pointer, $i$, is secured to the center of the plate $h$ by the screw 8, having the rosette 5 at its upper end. An irregularly-toothed wheel, $k$, is secured to the large end of the index-finger by a screw passing through its center, as best shown in Fig. 13. The index-wheel has its periphery serrated, being provided with fifty ratchet-teeth, and also with a series of numbers, from ten to one hundred, arranged at regular intervals, as shown. A spring-pawl, 2, is attached to the sliding bar 24, and intersects with the teeth of the index-wheel in such a manner that when the bar advances the wheel will be revolved intermittingly, or one tooth at a time. A stud or pin, 109, projects upwardly from the bed A on a line drawn through the center of the screw 8 and parallel with the bar I. A lever, $l$, is pivoted at 110 to the bed A contiguous to the index-wheel $h$, and to this lever there is also pivoted an auxiliary lever, $p$. The lever $p$ works in connection with the stud 102 projecting from the side of the disk F' to stop the machine when the thread breaks, and the lever $l$ works in connection with said stud and with the wheel $k$ to stop it at any given or desired point, as will be understood by the following: A spring, 53, is inserted between the lever $p$ and the side of the bracket Q nearest the disk F, which spring, by its expansive action, tends constantly to force the lever against the disk F' and across the path of the stud 102; but the lever is prevented from coming into contact with the disk or stud by the thread on its way from the bobbin $C^1$ passing around or against the bent arm 112, forming a part of the lever, the tension or strain of the thread overcoming the action of the spring 53, and keeping the lever from contact with the stud until the thread is broken or removed.

When the machine is not threaded up or in use the lever $p$ is kept from contact with the stud 102 by the stop or hook $y$ pivoted to the bracket Q, and which is so arranged as to hook around and hold the arm 112. The lever $l$ is provided with an arm, $n$, and between this arm and the side of the bracket Q, farthest from the disk F, there is a spring, $x$, which acts expansively to force the lever in a direction opposite, or away from, the disk F' and stud 102; but as the index-wheel $h$ revolves the wheel $k$ is brought into contact with a stud or projection, $m$, on the side of the lever and forces it against the disk F' or across the path of the stud 102.

The operation of the wheel $k$ in actuating the lever $l$ is as follows: The wheel is centrally journaled or pivoted to the index-finger $i$, and under the head of the screw forming its journal there is a friction-spring (not shown) to prevent it from revolving too freely on its seat. When the wheel is in a position to bring the blank side 100 against the projection $m$ it cannot pass the projection, and the lever $l$ will, consequently, be forced across the path of the stud 102 and the machine stopped. The wheel $k$ is, therefore, always set to bring this blank into contact with the projection $m$ at the precise time at which it is desired to have the machine stop.

The stud 109 serves as an indicator at which the figures 100 on the index-wheel should always be set in starting the machine. The wheel being so set, if it is desired to make just one hundred rows of stitches, and then to have the machine stop automatically, the wheel $k$ should be adjusted so that its tooth 99 will be in contact with the stud $m$, the index-finger $i$ at the same time pointing to the stud 109, which, as the wheel $h$ revolves, will cause the wheel $k$ to be partially turned on its seat, bringing the blank 100 into a proper position to strike the stud $m$ when the wheel $h$ has made a complete revolution, or the machine has made one hundred rows of stitches. If it is desired to make two hundred rows of stitches, or to have the wheel $h$ revolved twice before the machine is stopped, the wheel $k$ should be so set that the blank 100 will pass the stud $m$ at the first and second revolutions of the wheel $h$, or so that the tooth 103 will be in contact with the stud $m$ when the machine is started up, and so on for any greater number of rows. To adjust the machine for any number of rows less than one hundred the figures 100 on the wheel $h$ should be set, as before, at the indicator, 109, and the finger $i$ placed at the numeral corresponding with the number of rows it is desired to make, the wheel $k$ being so set that the blank 100 will be brought directly into contact with the stud $m$ as the wheel $h$ revolves. To adjust it to knit any number of rows greater than one hundred, but not exceeding two hundred, the figures 100 on the wheel $h$ should be set at the indicator 109, and the finger $i$ at the numeral, which added to one hundred, would give the required number of rows; for instance, if one hundred and ninety rows are to be made the wheel $h$ being in a proper position, the finger $i$ must be set at 90, and the wheel $k$ so adjusted that the tooth 99 will come into contact with the stud $m$, which will turn the wheel $k$ to bring the blank 100 into position to stop the machine at the next revolution of the wheel $h$. In Fig. 13 the index is represented as set for one hundred and twenty rows of stitches.

It will be understood that the finger $i$ is to be firmly secured in position by the screw 8 each time it is set; also, that before starting the machine the figures 100 on the wheel $h$ should always be placed opposite the indicator 109.

In threading up my improved machine for use the thread on the bobbin $C^1$ is first carried under the tension-plate $u$, which is operated by the screw and spring $v$, thence around the end of the arm 112 of the lever $p$, under the stud O, through the hook in the guide $f$, and thence under the hook 18 into the throat 19 of the thread-carrier T, through which it is drawn one or two inches. The rod $t$ being on the stud 28, and the machine threaded up as described, if, now, power is applied to the wheel B, the bar I will be caused to traverse from right to left by means of the fin G. The pitman N, acting upon the pendulous lever P, will cause it to swing toward the bar, carrying down the fingers 94 and 95 to their lowest position. The cam-slot 79' in the bracket Q, acting upon the looper c through the stud 15, will raise it and permit it to pass over the teeth of the bar I, the thread-carrier T at the same time also passing over, and the stripper 22 under, them, laying the thread between two of the teeth of the bar.

As the thread-carrier advances in the manner described the stud 29, working in the groove V in contact with the feather W, will vibrate the carrier, and cause it to pass the thread over or across the tooth next at the left, the hook 74 on the tooth catching and holding it when the carrier is withdrawn, as shown in Fig. 4. The disk F' continuing to revolve, the pitman N will cause the lever P to recede, carrying with it the stripper, looper, and thread-carrier to their original positions, the fingers 94 and 95 in the meantime rising and grasping the thread to draw it down out of the path of the looper and stripper, and hold the loop thus formed more securely in place on the hook of the tooth until the thread-carrier, looper, and stripper again commence advancing. This is repeated until a turn of the thread is taken around each tooth between the gages L L⁴, and a selvage is formed on the work, or the web is "set up." When the bar I has traversed from right to left until the projection 33 on the gage L strikes the dog 51 on the plate 75, the fin G will be operated upon, as hereinbefore described, and the movement of the bar reversed, causing it to traverse from left to right. At the same time the reverse motion of the bar takes place the end 73 of the gage L will strike the end of the arm 23 attached to the sliding bar 24, causing the rod t to swivel the plate 25 and change the position of the feather W, which will cause the lateral movements of the thread-carrier to be reversed in relation to the teeth of the bar, to correspond with the movement of the same, so that, as the bar traverses from left to right, the thread will also be laid across the hooks of the teeth from left to right instead of from right to left, thus forming the stitch 47 shown in Fig. 12. As the row of stitches is cast upon the teeth the stripper 22 will act to push the loop back on the tooth as soon as formed, where it will be picked up by the looper working in the groove 10, and lifted over or "cast off" from the hook 74 on the end of the tooth, and allowed to slip down over the new loop being formed, and to enter into the composition of the work or web K, as shown in Figs. 4 and 11.

It will be seen that each loop of the stitches shown at 47 in Fig. 12 is twisted.

To form a web composed of alternate rows of twisted and plain stitches, as seen at 46 in Fig. 12, the rod t should be entirely disconnected from the plate 25. This will cause the movements of the thread-carrier to be constant, while the motion of the bar I will be reversed at the end of each row of stitches, as before described.

To form a web composed entirely of plain stitches, the rod t should be kept on the stud 28', which will cause the lateral movements of the thread-carrier to be reversed in relation to the movements of the bar I, as compared with its movements in making the stitch 47, while the movements of the bar will be the same.

The stud working in the cam-slot 79' is elongated, as shown at 48 in Fig. 3, to force the thread down into a proper position to be readily taken or grasped by the fingers 94 and 95.

The groove 10 in the top of the tooth J enables the hook of the looper to pass under the old loop readily, and insures its detachment from the tooth.

It will be obvious that the index-wheel h is actuated or turned only when the bar I advances from right to left, thus rendering but fifty teeth necessary on its periphery to cause it to indicate twice that number of rows of stitches.

Figure 16:
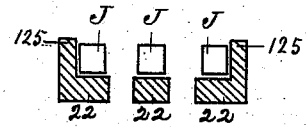

The sides of the stripper 22 are provided with upwardly-projecting flanges 125, as best seen in Fig. 16. The object of these flanges is to insure the catching of the loops by the stripper as it advances under the teeth, being of most importance in setting up the work, and when very fine thread is employed.

When one of the studs 43 on the plate 38 is brought into contact with the stud 44, as described, the plate will not thereby be sufficiently turned or revolved on its axis to properly change the ends of the fin G.

To obviate this difficulty the upper ends of the cam E are rounded or curved inwardly, as shown at 127, so that when the stud 44 has partially turned the plate 38 the next adjoining stud to the one in contact therewith will be carried under the cam E, and as the plate advances the stud in contact with 44 will escape and be caught on the rounded end 127, over which it will ride, and thus the proper revolution of the plate 38 and cam 39 be effected.

It will be obvious that by having both ends of the fin G free, as described, the pitch of the thread or screw which it forms will be less abrupt than would otherwise be the case, thus greatly reducing friction, and giving a more uniform movement to the bar I.

The object of the spindle E' is for filling the bobbin C¹, which may be accomplished to the best advantage by disconnecting the pitman N and adjusting the fin G midway between the disks, or so as to prevent the bar I from traversing.

I am aware that Letters Patent of the United States for improvements in knitting-machines were granted May 29, 1866, and numbered 55,103, and also January 19, 1869, and numbered 86,033, and also April 12, 1870, and numbered 101,875; but all of said patented machines use an eye-pointed needle, and are otherwise essentially different from my present invention. I therefore do not herein claim anything shown or described in either of said Letters Patent when in and of itself considered; but

Having thus described my invention, what I claim is—

1. In a knitting-machine, substantially such as described, the following instrumentalities, to wit: the serrated bar I, thread-carrier T, looper c, and connecting mechanism, as described, combined and arranged to operate as and for the purpose specified.

2. The thread-carrier T, in combination with the looper c, and with devices for producing a proper tension on the thread before it reaches the looper, as described.

3. The thread-carrier T, with the throat 19, in combination with the spring-cap T', substantially as set forth and specified.

4. The looper c and lever P, in combination with the projection Q, provided with the cam-slot 79, constructed and arranged to operate substantially as and for the purpose specified.

5. The looper c, provided with the elongated stud 48, substantially as and for the purpose set forth and specified.

6. The fingers 94 and 95 and operating mechanism, substantially as described, in combination with the looper c, teeth J, and thread-carrier T, as set forth and specified.

7. The bracket-arm extension $Z^1$ and the plate Z, provided with the cam-slot I', substantially as set forth.

8. The bracket-arm extension $Z^1$, having the rib 52, and the plate Z, provided with the cam-slot I', in combination with the finger 95 and its operating mechanism, substantially as set forth.

9. The bracket Q, provided with the cam-slot 79', substantially as set forth.

10. The pitman R, provided with the finger 94, in combination with the lever P, bracket Q, and operating mechanism, substantially as set forth.

11. The finger 95, pivoted directly to the finger 94, and provided with the stud 93, and with a spring at its pivotal support 90, combined and arranged substantially as set forth and specified.

12. In combination with the bracket Q, the tri-armed lever P, the thread-carrier T, looper c, pitman R, stripper 22, and operating mechanism, substantially as set forth and specified.

13. The stripper 22, in combination with the looper c, carrier T, bar I, provided with teeth J, the fingers 94 and 95, and connecting mechanism, substantially as specified.

14. In combination with the lever P, the stripper 22, and spring 21, arranged between said lever and stripper, to permit the latter to yield in passing under the teeth of the bar I, substantially as set forth and specified.

15. The stripper 22, provided with the flanges 125, substantially as set forth.

16. The adjustable thread-guide f, in combination with the bracket Q and carrier T, substantially as specified.

17. The pitman N, provided with the latch 54, in combination with the stud O and disk $F^1$, substantially as set forth and specified.

18. The pin G, having two free ends, 42, in combination with the disks F F' and cam 39, substantially as set forth.

19. The disks F and F', and the plate 38, provided with the studs 43, in combination with the stud 44, cam E, cam 39, and fin G, substantially as specified.

20. The sliding plate 75, provided with the stud 44 and cam E, constructed and arranged to operate substantially as and for the purpose set forth and specified.

21. The spring-pin 36, in combination with the plate 75 and bracket $C^{21}$, substantially as specified.

22. The plate 75, provided with the stud 44 and cam E, in combination with the disk F, plate 38, and stud 43, substantially as set forth.

23. The plate 75, provided with the dog 51, the cam E, and the stud 44, in combination with the gage L, provided with the projection 33, as described.

24. In combination with the plate 75, the rod 34 and lever w, substantially as set forth.

25. The bar 91, provided with the groove V and feather W, in combination with the carrier T, substantially as specified.

26. The feather W, provided with the cross-bar 98, having the ridge 27, in combination with the lever 25, provided with the studs 28 and 28', and connecting mechanism, substantially as set forth.

27. The sliding bar 24, provided with the bracket r and rod t, in combination with the lever 25, cross-bar 98, feather W, and their operating mechanism, substantially as set forth.

28. The bar I, gages L $L^4$, arm 23, sliding bar 24, and feather W, combined to operate with connecting mechanism substantially as specified.

29. The bar I and gage L, provided with projection 33, in combination with the plate 75, having the dog 51, substantially as specified.

30. The bar I and gage $L^4$, provided with the projection 33, in combination with the lever w, bar 34, and plate 75, substantially as set forth.

31. The index-wheel h, provided with the screw 3, in combination with the spring 4 and counterbored hub 9, substantially as set forth and specified.

32. The pointer i, in combination with the wheel h and screw 8, substantially as set forth.

33. The wheel K and pointer i, combined and arranged to operate substantially as set forth.

34. The combination of the wheel h, pointer i, screw 8, and wheel k, substantially as specified.

35. The disk F, provided with the stud 102, in combination with disk F', lever l, and connecting mechanism, as described.

36. The stop-lever l, provided with the projection m, in combination with the disk F', having stud 102, the pointer i, and wheel k, substantially as set forth.

37. The stop-lever l, provided with the arm n, in combination with the bracket Q, and spring x, substantially as specified.

38. The stop-lever p, provided with the bent arm 112, in combination with the disk F', and operative mechanism, as described, substantially as set forth.

39. The lever p, pivoted directly to the lever l, and provided with the spring 53, in combination with the bracket Q and disk F', provided with the stud 102, substantially as specified.

40. In combination with the lever p, provided with the arm 112, the hook y, and bracket Q, substantially as set forth.

41. The combination of the tension-plate u, guide f, bracket Q, and arm 112, substantially as specified.

42. The rests 37, in combination with the disks F F', substantially as set forth.

JONAS HINKLEY.

Witnesses:
C. A. SHAW,
H. E. METCALF.